(12) United States Patent
Balaraman (10) Patent No.: US 12,319,137 B2
(45) Date of Patent: Jun. 3, 2025

(54) BRACKET FOR A ROTATING SHAFT (71) Applicant: GKN Driveline North America, Inc., Auburn Hills, MI (US)

(72) Inventor: Varadarajan Balaraman, Oxford, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 394 days.

(21) Appl. No.: 18/162,675

(22) Filed: Jan. 31, 2023

(65) Prior Publication Data
US 2023/0256816 A1 Aug. 17, 2023

Related U.S. Application Data (60) Provisional application No. 63/310,224, filed on Feb. 15, 2022.

(51) Int. Cl.
| F16C 35/077 | (2006.01) |
| B60K 17/24 | (2006.01) |
| F16C 35/063 | (2006.01) |
| F16M 13/02 | (2006.01) |

(52) U.S. Cl.
CPC ............ *B60K 17/24* (2013.01); *F16C 35/063* (2013.01); *F16M 13/02* (2013.01)

(58) Field of Classification Search
CPC ....... B60K 17/24; F16C 35/063; F16M 13/02; F16B 17/006; F16B 2/24; F16B 19/02
See application file for complete search history.

(56) References Cited

U.S. PATENT DOCUMENTS

| 2,872,253 | A | * | 2/1959 | Foote | F16C 35/047 |
| | | | | | 384/434 |
| 4,571,098 | A | * | 2/1986 | Rudnik | F16C 33/6622 |
| | | | | | 384/537 |
| 6,997,813 | B2 | | 2/2006 | Blumke et al. | |
| 8,186,641 | B2 | | 5/2012 | Valovick et al. | |
| 9,511,664 | B2 | * | 12/2016 | Mori | B60K 17/24 |
| 2002/0171012 | A1 | | 11/2002 | Boutin | |
| 2003/0234132 | A1 | | 12/2003 | Blumke et al. | |
| 2003/0236122 | A1 | | 12/2003 | Blumke et al. | |
| 2003/0236123 | A1 | | 12/2003 | Blumke et al. | |
| 2017/0184154 | A1 | * | 6/2017 | Kawarada | B60K 17/24 |

* cited by examiner

*Primary Examiner* — Amy J. Sterling
(74) *Attorney, Agent, or Firm* — Reising Ethington P.C.

(57) ABSTRACT

A bracket for a rotating shaft includes a base and a retainer assembly. The base has a mount body and a receiver, first and second tabs extending from receiver and overlapping spaced apart portions of the mount body. The retainer assembly has a first retainer and a second retainer that overlap the tabs and trap the tabs against the mount body to hold the receiver on the mount body, and the first retainer overlaps part of the second retainer and the second retainer overlaps part of the first retainer to maintain the positions of the retainers relative to the mount body and receiver.

17 Claims, 5 Drawing Sheets

BRACKET FOR A ROTATING SHAFT

REFERENCE TO RELATED APPLICATIONS

This application claims the benefit of U.S. Provisional Application Ser. No. 63/310,224 filed on Feb. 15, 2022 the entire content of which is incorporated herein by reference in its entirety.

TECHNICAL FIELD

The present disclosure relates generally to a bracket for a rotary shaft such as a vehicle propshaft.

BACKGROUND

Brackets for rotating shafts often include a cylindrical part received around the shaft and a larger bracket used to mount the bracket to a vehicle. Because the shaft may be part of an assembly that may prevent later assembly of the bracket to the shaft, the brackets are assembled to the shaft during processing of the shaft and shipping of the shaft. The larger brackets consume space in workstations and during shipping, which increases the cost to manufacture, assembly and ship the shafts.

SUMMARY

In at least some implementations, a bracket for a rotating shaft includes a base and a retainer assembly. The base has a mount body and a receiver, the receiver having a circumferentially extending inner surface and an outer surface, a first tab extending from the outer surface to a first free end spaced from the outer surface, and a second tab extending from the outer surface to a second free end spaced from the outer surface. The first tab and second tab overlap spaced apart portions of the mount body. The retainer assembly has a first retainer and a second retainer. The first retainer has a first end including a first end with a first opening through which the first tab and part of the mount body is received. The second retainer has a first end with a second opening through which the second tab and part of the mount body is received. The first retainer has a second end opposite to the first end of the first retainer and overlapping the first end of the second retainer with the first end of the second retainer located between the second end of the first retainer and an outer surface of the receiver, and the second retainer has a second end opposite to the first end of the second retainer and overlapping the first end of the first retainer with the first end of the first retainer located between the second end of the second retainer and an outer surface of the receiver.

In at least some implementations, adjacent to the second end of the first retainer, the first retainer includes a cage that extends over the first end of the second retainer. In at least some implementations, adjacent to the second end of the second retainer, the second retainer includes a cage that extends over the first end of the first retainer.

In at least some implementations, the first retainer includes a first stop surface engaged with the first tab and a second stop surface engaged with a surface of the mount body on an opposite side of the mount body from a side of the mount body that is contacted by the first tab, and the first opening extends between the first stop surface and the second stop surface. In at least some implementations, the second retainer includes a first stop surface engaged with the second tab and a second stop surface engaged with a surface of the mount body on an opposite side of the mount body from a side of the mount body that is overlapped by the second tab, and the second opening extends between the first stop surface and the second stop surface.

In at least some implementations, the mount body has an inner surface, and the mount body has a pocket that with reference to the inner surface is concave, and wherein part of the receiver is located in the pocket with at least part of the outer surface of the receiver against a surface of the mount body in the pocket, and wherein the portions of the mount body that are overlapped by the first tab and the second tab are on opposite sides of the pocket. In at least some implementations, the inner surface of the receiver has a central axis, the receiver has a width in the axial direction, the mount body has a width in the axial direction and the first retainer includes two rails that extend between the first end of the first retainer and the second end of the first retainer. The two rails are spaced apart by a distance greater than the width of at least the part of the receiver located in the pocket and the width of the mount body at the pocket, and a portion of the receiver and mount body is located between the two rails. In at least some implementations, the second retainer includes two rails that extend between the first end of the second retainer and the second end of the second retainer, and wherein part of the receiver located in the pocket and a portion of the mount body are located between the two rails of the second retainer.

In at least some implementations, the first stop surface and second stop surface of the first retainer are spaced apart a distance so that the first tab and adjacent portion of the mount body are closely received between the first stop surface and the second stop surface to trap the first tab against mount body.

In at least some implementations, the mount body is a separate component from the receiver and the receiver is held against the mount body by the first retainer and the second retainer.

In at least some implementations, a shaft assembly, includes a shaft arranged for rotation about an axis, a bearing coupled to the shaft, an isolator coupled to the bearing, and a bracket coupled to the isolator. The bracket has a mount body and a receiver. The receiver has a circumferentially extending inner surface and an outer surface, a first tab extending from the outer surface to a first free end spaced from the outer surface, a second tab extending from the outer surface to a second free end spaced from the outer surface, and the first tab and second tab overlap spaced apart portions of the mount body. The retainer assembly has a first retainer and a second retainer. The first retainer has a first end including a first end with a first opening through which the first tab and part of the mount body is received. The second retainer has a first end with a second opening through which the second tab and part of the mount body is received. The first retainer has a second end opposite to the first end of the first retainer and overlapping the first end of the second retainer, and the second retainer has a second end opposite to the first end of the second retainer and overlapping the first end of the first retainer.

In at least some implementations, the first retainer includes a first stop surface engaged with the first tab and a second stop surface engaged with a surface of the mount body on an opposite side of the mount body from a side of the mount body that is contacted by the first tab, and the first opening extends between the first stop surface and the second stop surface. In at least some implementations, the second retainer includes a first stop surface engaged with the second tab and a second stop surface engaged with a surface of the mount body on an opposite side of the mount body from a side of the mount body that is overlapped by the second tab, and the second opening extends between the first stop surface and the second stop surface.

In at least some implementations, the mount body has an inner surface, and the mount body has a pocket that with reference to the inner surface is concave, part of the receiver is located in the pocket with at least part of the outer surface of the receiver against a surface of the mount body in the pocket, and the portions of the mount body that are overlapped by the first tab and the second tab are on opposite sides of the pocket. In at least some implementations, the inner surface of the receiver has a central axis, the receiver has a width in the axial direction, the mount body has a width in the axial direction and the first retainer includes two rails that extend between the first end of the first retainer and the second end of the first retainer, and the two rails are spaced apart by a distance greater than the width of at least the part of the receiver located in the pocket and the width of the mount body at the pocket, and a portion of the receiver and mount body is located between the two rails. In at least some implementations, the second retainer includes two rails that extend between the first end of the second retainer and the second end of the second retainer, and part of the receiver located in the pocket and a portion of the mount body are located between the two rails of the second retainer.

In at least some implementations, a bracket for a rotating shaft includes a base and a retainer assembly. The base has a mount body and a receiver, first and second tabs extending from receiver and overlapping spaced apart portions of the mount body. The retainer assembly has a first retainer and a second retainer that overlap the tabs and trap the tabs against the mount body to hold the receiver on the mount body, and the first retainer overlaps part of the second retainer and the second retainer overlaps part of the first retainer to maintain the positions of the retainers relative to the mount body and receiver.

The receiver and mount body may be separate components that are held together by the retainers. This may permit the receiver to be placed over a shaft without the mount body. This may facilitate manufacturing or processing of the shaft, such as painting or coating the shaft without the larger mount body getting in the way and taking up space. The retainers may be assembled to the bracket without fasteners, and can hold the receiver on the mount body when assembled together, and each retainer can inhibit movement of the other retainer relative to the receiver, to precent a retainer from moving off of a tab of the receiver.

BRIEF DESCRIPTION OF THE DRAWINGS

The following detailed description of preferred embodiments and best mode will be set forth with reference to the accompanying drawings, in which.

DETAILED DESCRIPTION

Figure 1:
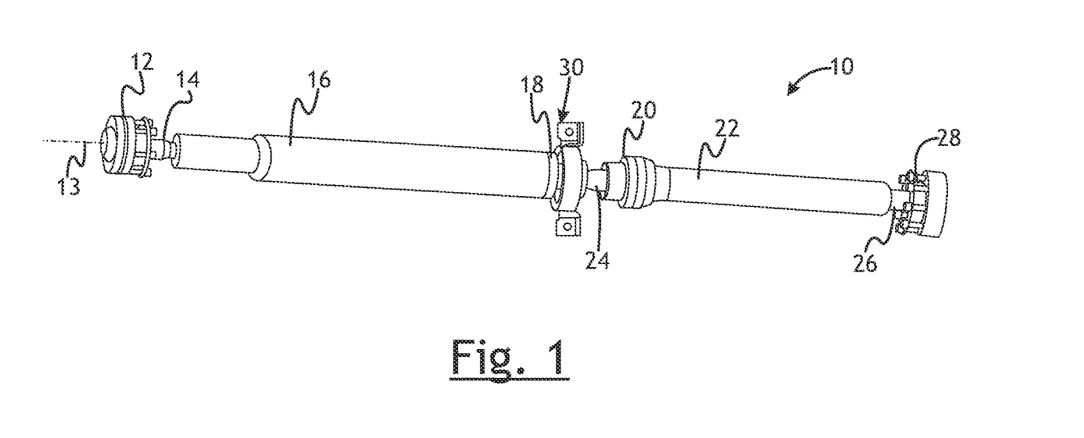
FIG. 1 is a perspective view of a propshaft assembly including a bracket.

Referring in more detail to the drawings, FIG. 1 illustrates a propshaft assembly 10 that is driven for rotation by a power train of a vehicle and which transfers rotary motion to provide a motive force for the vehicle. The propshaft assembly 10 includes a rotary joint, such as a constant velocity joint (CVJ) 12 arranged to be coupled to a power transmission unit of the vehicle that rotates the propshaft about a center axis 13. The CVJ 12 is coupled to an end 14 of a first tube shaft assembly 16 that rotates with the CVJ 12 and which is coupled at its opposite end 18 to another rotary joint which may be another CVJ 20. A second tube shaft assembly 22 is coupled at one end 24 to the CVJ 20 and at its other end 26 to another rotary joint which may be a further CVJ 28 that is arranged to be coupled to another component, like a rear power transfer unit or differential, via which a vehicle axle or sideshaft(s) are rotated. A bracket 30 is arranged to support the propshaft assembly 10 between the ends of the assembly and the bracket 30 is arranged to be mounted to a structural member of the vehicle.

Figure 2:
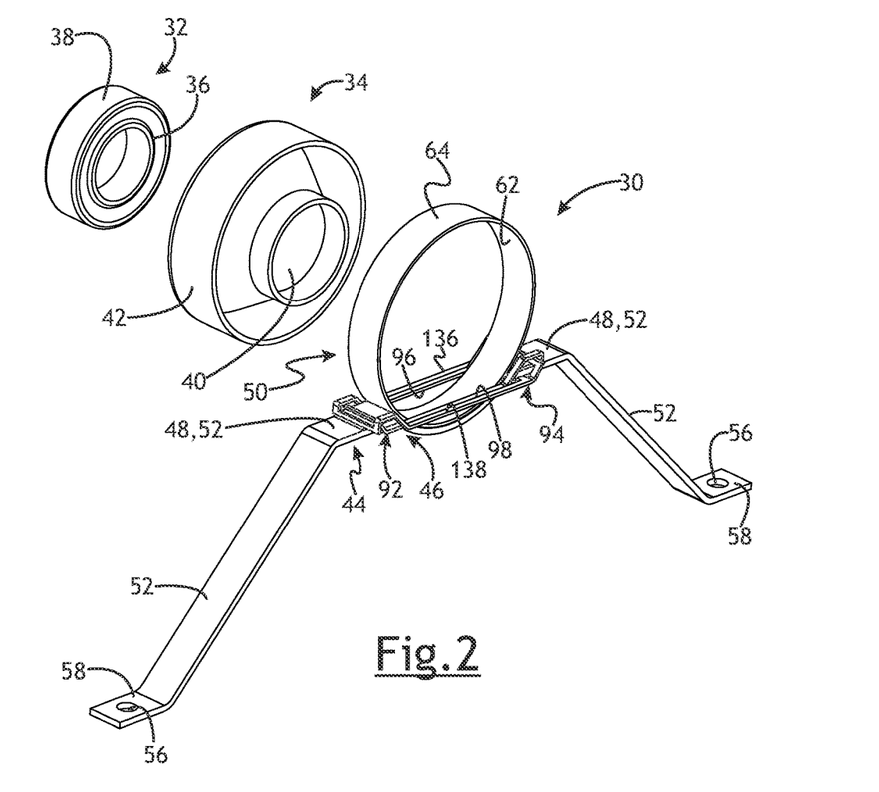
FIG. 2 is a perspective view of the bracket including.

As shown in FIG. 2, to facilitate rotation of the propshaft assembly 10 relative to the bracket 30, a bearing 32 surrounds part of the propshaft assembly 10, shown here as a portion of the first tube shaft assembly 16, and the bearing 32 is coupled to the bracket 30, often with a resilient isolator 34 between the bearing 32 and bracket 30 to damp vibrations and permit limited movement of the propshaft relative to the bracket 30. The bearing 32 may include an inner race 36, an outer race 38 and multiple balls trapped between the races 36, 38 to permit rotation of the inner race 36 relative to the outer race 38. The inner race 36 may be coupled to the first tube shaft assembly 16 for rotation with the first tube shaft assembly. The outer race 38 may be received in an opening 40 of the isolator 34 or otherwise coupled to the isolator 34, and the outer race 38 may be held against rotation so the propshaft and inner race 36 rotate relative to the outer race 38. The isolator 34 has a periphery engaged by and retained by the bracket 30. The isolator 34 may have a circumferentially continuous and circular outer surface 42 and be formed of a suitable polymeric material or composite of materials, and may be elastomeric and resilient, and may be compressed in assembly to retain the isolator 34 relative to the bracket 30, as described further below.

The bracket 30 includes a base 44, shown in FIGS. 2-5, and a retainer assembly 46 shown in FIGS. 2-4 and 6-11. In at least some implementations, the base 44 may include a mount body 48 and a receiver 50 (FIGS. 6 and 7) carried by the mount body 48 or coupled to the mount body 48 by the retainer assembly 46. The mount body 48 is arranged to be coupled to the vehicle and, in at least some implementations, has a pair of outwardly extending legs 52 that extend to opposite ends of the mount body 48. The legs 52 may be arranged on opposite sides of the propshaft, with the receiver 50 between ends 54 of the legs 52 and arranged to be received around the propshaft (e.g. the first tube shaft 16 in the example illustrated). Each leg 52 may include a coupling feature by which the mount body 48 is secured to the vehicle. In the example shown, the coupling feature is an opening 56 (FIG. 3) formed in each leg 52, such as in a foot 58 inclined relative to the leg 52 to be parallel to a surface of the vehicle. A bolt may extend through each opening 56 in the mount body 48 to secure the mount body 48 to the vehicle. In at least some implementations, to facilitate connection to the receiver 50, the mount body 48 may include a concave pocket 60 (labeled in FIGS. 3 and 5) shaped complementarily to a portion of the receiver 50. With reference to an inner surface 57 of the mount body 48, the pocket 60 is concave, and with reference to an outer surface 59 of the mount body 48, the pocket 60 is convex.

Figure 6:
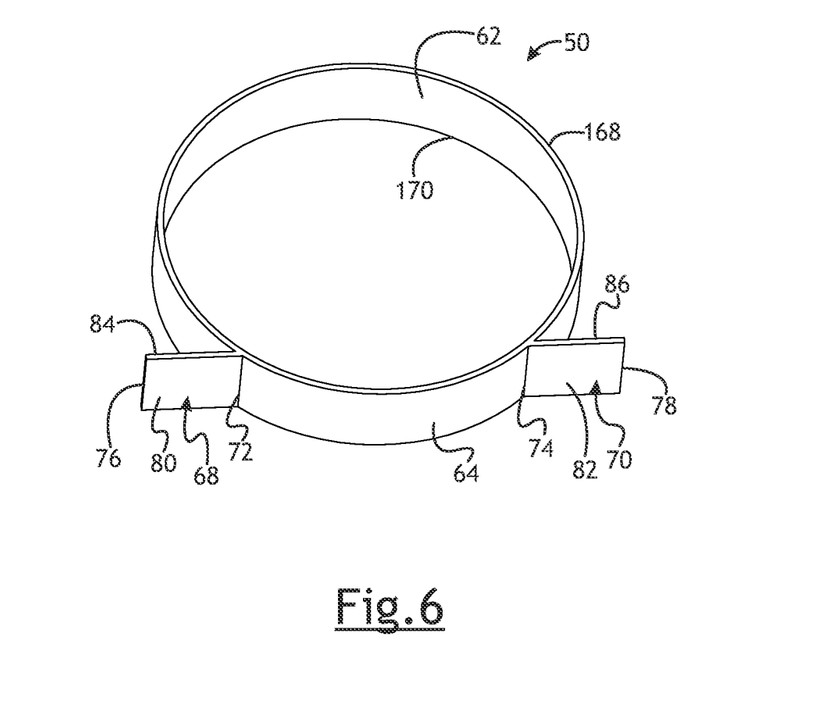
FIG. 6 is a perspective view of a receiver of the bracket.
Figure 7:
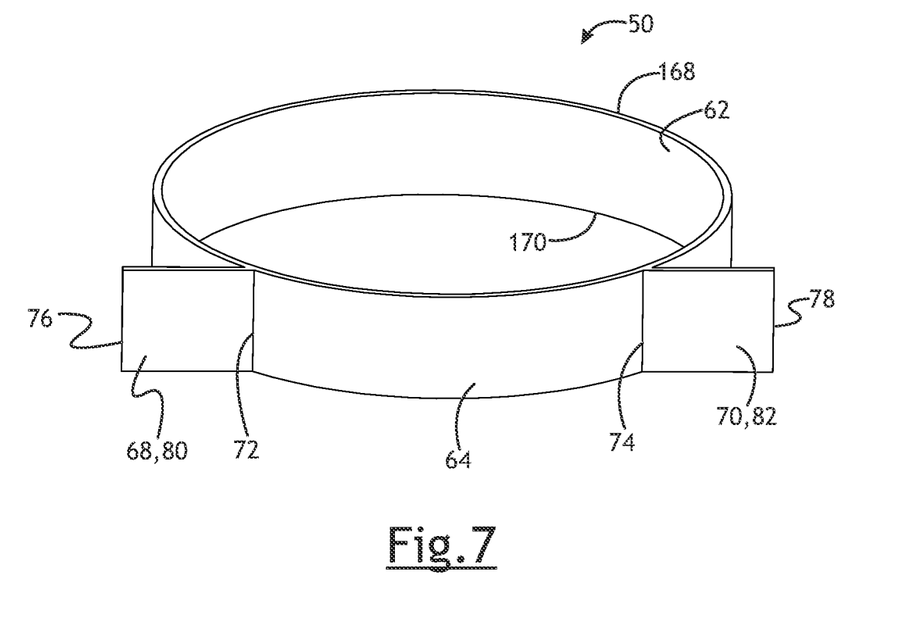
FIG. 7 is a perspective view of the receiver.

The receiver 50 may generally be a hoop or tube, and includes an opening 61 defining a radially inner surface 62 that is opposite to a radially outer surface 64 of the receiver 50. The inner surface 62 may be annular and continuous, and may have a constant radius relative to an axis 66, if desired. The outer surface 64 may extend circumferentially, and the receiver 50 may have any desired radial thickness (distance between the inner surface 62 and outer surface 64) which may be constant along more or all of the receiver 50. As shown in FIGS. 6 and 7, the receiver 50 includes a pair of outwardly extending tabs 68, 70 called herein a first tab 68 and a second tab 70. Each tab 68, 70 is arranged to overlie a separate one of the legs 52 of the mount body 48 outboard of the pocket 60. That is, the first tab 68 is arranged on one side of the pocket 60 and the second tab 70 is arranged at the opposite side of the pocket 60. In at least some implementations, the tabs 68, 70 may be parallel to each other, and may be connected to the outer surface 64 at a first end 72, 74 and extend away from the receiver to a free, second end 76, 78 spaced from the outer surface. The tabs 68, 70 may have the same length, or may be of any desired length. The tabs 68, 70 may be generally planar or otherwise shaped as desired, and may have a first surface 80, 82 adapted to engage the mount body and a second surface 84, 86 facing in the opposite direction, away from the mount body.

The mount body 48 and receiver 50 may conveniently be formed from metal, such as steel, and may be stamped, extruded or otherwise formed, lightweight and relatively inexpensive to produce. The mount body 48 and receiver 50 may be formed separately from each other and connected together after they are formed, to define the base 44 of the bracket 30. An axial width of the receiver 50 (dimension parallel to the axis 66) may be the same as or different from an axial width of the mount body 48. A centerline 88 (FIG. 4) of the receiver 50 may be aligned with a centerline 90 (FIG. 5) of the mount body 48, if desired. So arranged, the first portion 70 of the receiver 50 is parallel to and is partially and may be completely overlapped by the mount body 48. In at least some implementations, such as that shown in the drawings, the base 44 is wider than the receiver 50, and the receiver 50 is axially centered on the base 44.

In at least some implementations, the receiver 50 is circumferentially continuous and defines a complete annulus. In applications wherein part of the propshaft assembly 10 is larger in size than the opening 61 in the receiver 50, such as a CVJ, the receiver must be assembled onto the propshaft assembly prior to full assembly of the propshaft assembly. In at least some implementations, the receiver 50 may be pre-assembled onto the isolator 34, and the isolator 34 on the bearing 32, and these components may together be positioned over an end of a portion of the propshaft assembly 10, such as end 18 of the first tube shaft assembly 16. Thereafter, the end 18 may be assembled to the CVJ 20. In at least some implementations, the outer surface 42 of the isolator 34, prior to assembly into the bracket 30, is greater than the effective diameter of the inner surface 62 of the receiver 50. In this way, the receiver 50 provides a compressive force on the isolator 34 which tends to prevent relative movement between the isolator 34 and receiver 50. In addition or instead, retention features may be provided on one or both of the isolator and receiver to retain the receiver in position on the isolator (e.g. tongue and groove, overlapped flanges, or snap-fit latches, etc).

In at least some implementations, the receiver 50 is not fixed to the mount body 48 by welding or otherwise, and the receiver 50 is assembled onto the propshaft assembly 10 prior to the mount body 48 being coupled to the receiver 50, as set forth in more detail below. This permits assembly and production processes to be performed on the propshaft assembly 10 (e.g. painting), and shipping of the assembly 10 without the mount body 48 being connected to the assembly. This may be desirable because the mount body 48 extends outwardly from opposite sides of the propshaft assembly 10 and thereby increases the overall size of the assembly and the space needed to accommodate multiple propshaft assemblies next to each other, for example, in a workstation (e.g. paint station) or in a container for shipping. Thus, more propshaft assemblies can be received in a given space when the mount body 48 is not coupled to the assembly than when the mount body is coupled to the assembly.

Figure 3:
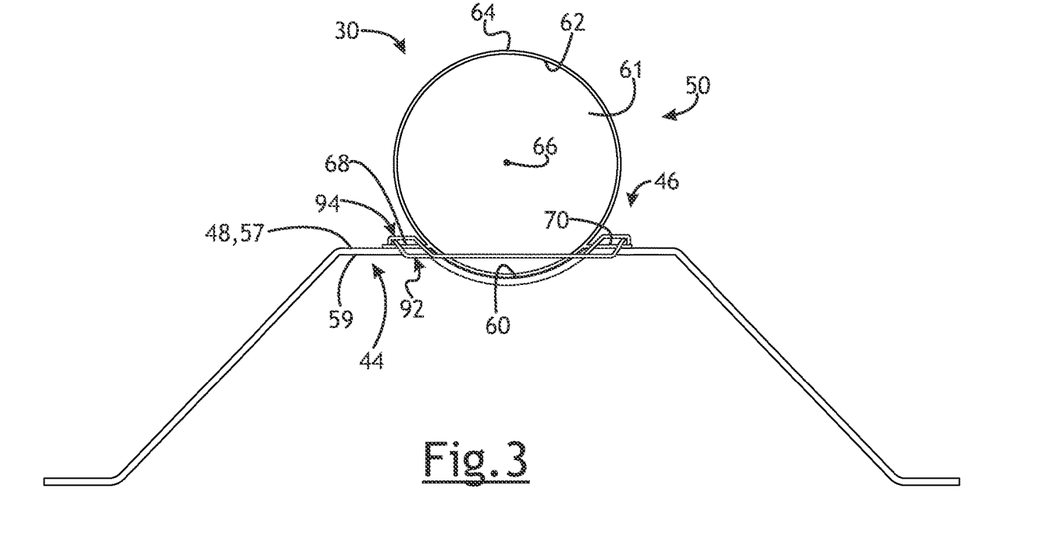
FIG. 3 is a perspective view of the bracket.
Figure 4:
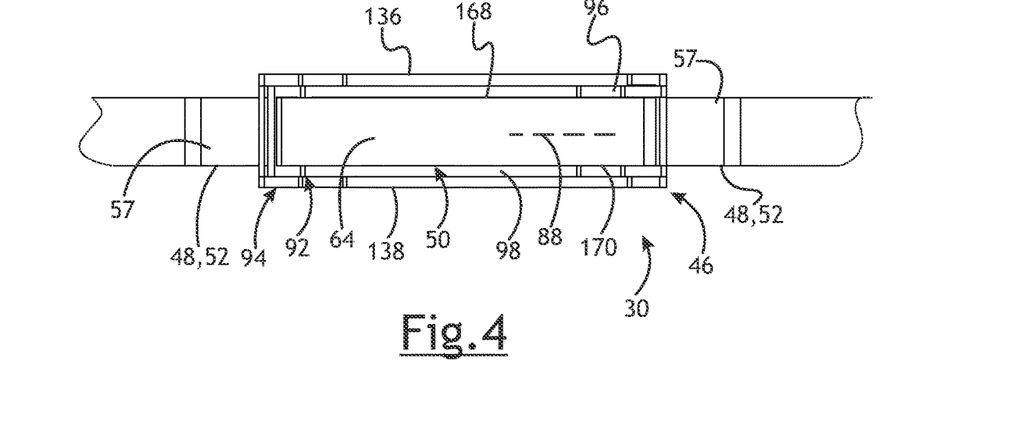
FIG. 4 is a top view of the bracket.
Figure 5:
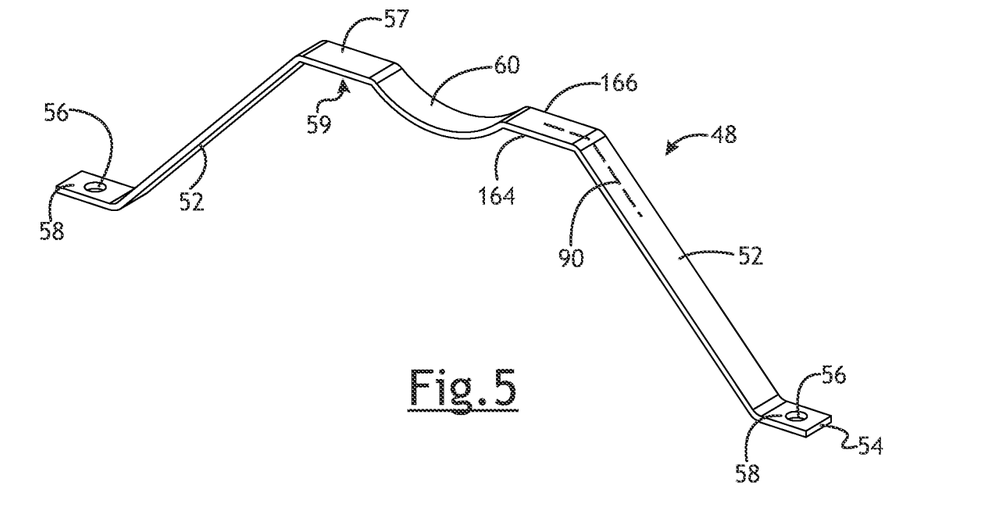
FIG. 5 is a perspective view of a mount body of a base of the bracket.

Prior to installing the propshaft assembly 10 into a vehicle, the mount body 48 is coupled to the receiver 50 by the retainer assembly 46. In at least some implementations, the retainer assembly 46 includes a first retainer 92 and a second retainer 94. As set forth in more detail below, the retainers 92, 94 overlap each other, and the tabs 68, 70, and trap the tabs 68, 70 against the mount body 48 to prevent separation of the receiver 50 from the mount body 48 when assembled, as shown in FIGS. 2-4.

Figure 8:
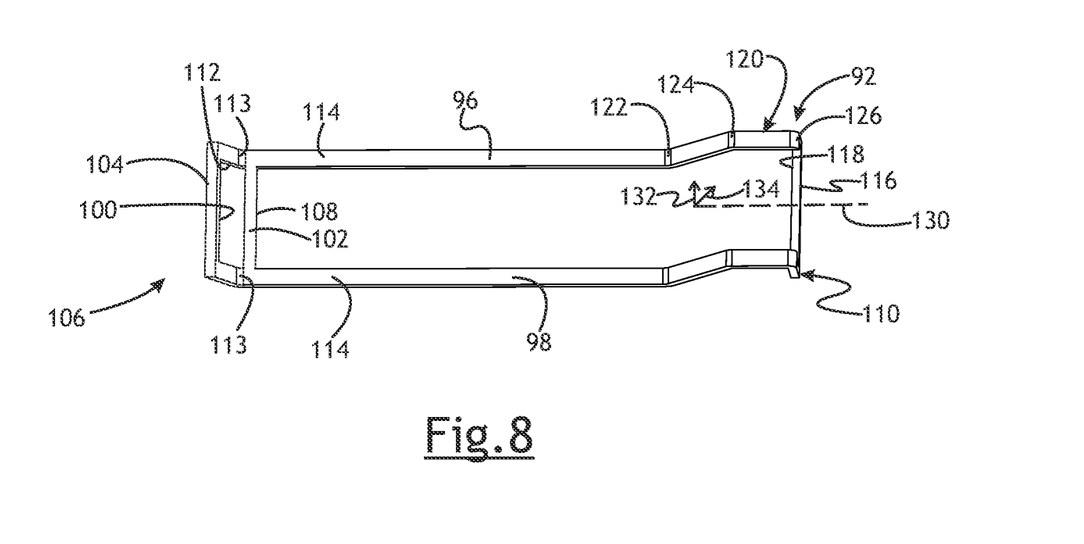
FIG. 8 is a perspective view of a first retainer.
Figure 9:
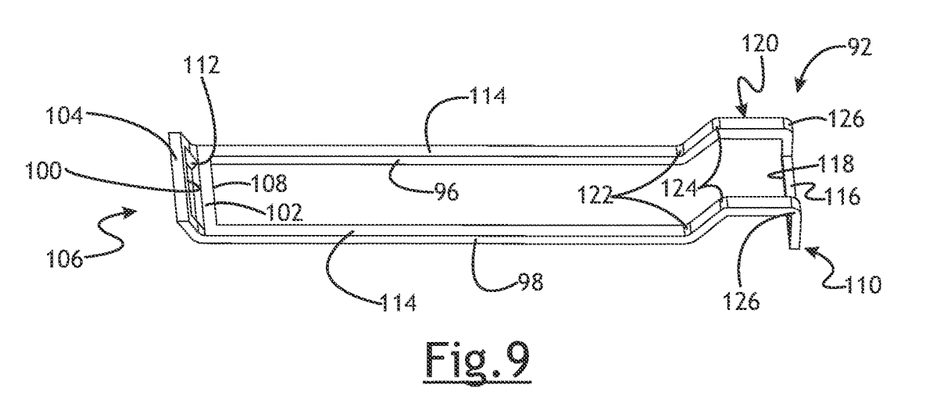
FIG. 9 is a perspective view of the first retainer.
Figure 10:
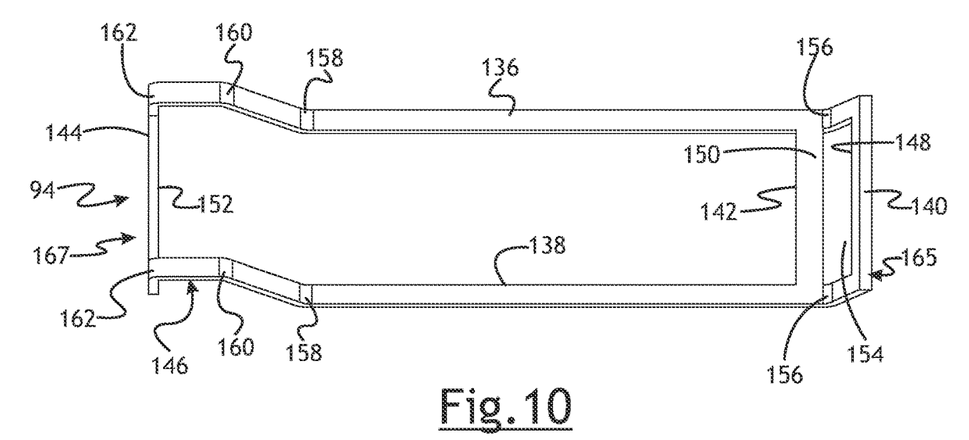
FIG. 10 is a perspective view of a second retainer.
Figure 11:
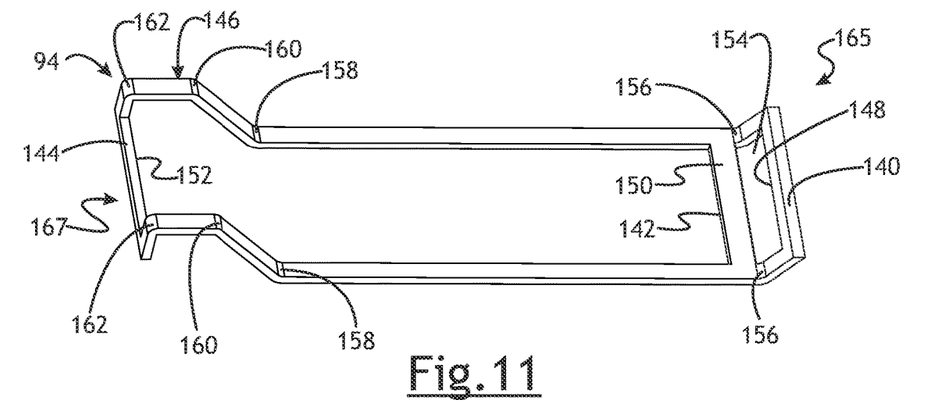
FIG. 11 is a perspective view of the second retainer.

As shown in FIGS. 8 and 9, the first retainer 92 includes two rails 96, 98 that are spaced apart from each other by a distance sufficient to accommodate the axial width of at least one of the mount body legs 52 and the receiver 50. The rails 96, 98 may be parallel to each other and extend a distance greater than the distance between the first ends 72, 74 of the tabs 68, 70. A first stop surface 100 is provided to overlie the second surface 84 of the first tab 68 and a second stop surface 102 is arranged to overlie an area of the mount body 48 on the opposite side of the mount body as the first tab 68 (e.g. part of the base overlapped by the first tab 68) such that the first tab 68 and mount body 48 are trapped between the first stop surface 100 and the second stop surface 102. In at least some implementations, the first stop surface 102 is defined by a surface of a first wall 104 that interconnects the rails 96, 98 at or near a first end 106 of the first retainer. And the second stop surface 102 is defined by a surface of a second wall 108 that interconnects the rails 96, 98 spaced from the first end 106 and closer to the first end 106 than to the opposite, second end 110 of the retainer 92. An opening 112 is defined between the first wall 104 and second wall 108. The first and second walls 104, 108 may be parallel to each other, and perpendicular to the rails 96, 98, in at least some implementations. Between the first wall 104 and second wall 108, the rails 96, 98 include a first bend 113 which provides a portion of the rails between the bend 113 and first end 106 that is at an angle to the tabs 68, 70 of between 90 and 135 degrees, and the bend 113 defines a concave portion of a first surface 114 of the rails 96, 98.

A third wall 116 may be connected to each rail 96, 98 at or near the second ends 110 of the rails 96, 98. A surface of the third wall 116, which may define a third stop surface 118, is arranged to overlap and engage a surface of the mount body or the second tab 70 of the receiver 50. Between the first end 106 and second end 110 of the first retainer 92, the first retainer 92 includes a cage portion 120 defined by a second bend 122 of between 90 and 150 degrees measured along the first surface 114 of the rails and defining a concave portion of the first surface of the rails, a third bend 124 of between 270 and 220 degrees (measured along the first surface 114 of the rails and defining a convex portion of the first surfaces), and a fourth bend 126 of between 45 and 90 degrees (measured along the first surface 114 of the rails and defining a convex portion of the first surfaces).

Using a reference system based upon a longitudinal centerline 130 (FIG. 8) of the first retainer 92, a lateral direction is perpendicular to the longitudinal centerline and shown by arrow 132 and a vertical direction is perpendicular to both lateral and longitudinal directions and shown by arrow 134. That is, longitudinal, lateral and vertical are three mutually perpendicular axes (e.g. like typical x, y and z axes). With this reference system, it can be said that:

1) the rails 96, 98 are laterally spaced apart;
2) the first and second ends 106, 110 of the rails 96, 98 are longitudinally spaced apart;
2) the first, second and third walls 104, 108, 116 extend laterally between the rails;
3) the first wall 104 is vertically spaced from the second wall 106 (by a distance at least equal to the thickness of the first tab 68 and the portion of the mount body 48 overlapped by the first tab 68);
4) extending from the first end 106 toward the second end 110, the second bend 122 provides a first portion of the cage 120 that is vertically inclined in a first direction, and the fourth bend 126 provides a second portion of the cage 120 that is vertically inclined in an opposite, second direction such that the cage 120 is generally C, J or U-shaped; and
5) the first bend 113, second bend 122, third bend 124 and fourth bend 126 are longitudinally spaced apart.

In at least some implementations, the second retainer 94 is similarly shaped as the first retainer 92 with a couple differences. As shown in FIGS. 1-3, 10 and 11, the second retainer 94 includes laterally spaced rails 136, 138, a first wall 140, a second wall 142, third wall 144, cage 146, first stop surface 148, second stop surface 150, third stop surface 152, opening 154, first bend 156, second bend 158, third bend 160 and fourth bend 162. The second retainer 94 is rotated 180 degrees compared to the first retainer 92 such that a first end 165 of the second retainer 94, that includes the first and second stop surfaces 148, 150, is arranged at the second tab 70 instead of the first tab 68 like the first end 106 of the first retainer 92. That is, the opening 154 and opposite first and second stop surfaces 148, 150, defined by laterally extending first and second walls 140, 142, are arranged relative to the second tab 70 in the same manner as the corresponding features of the first retainer 92 are arranged relative to the first tab 68. And a second end 167 including the cage 146 of the second retainer 94 is arranged over the first tab 68. In at least some implementations, the rails 136, 138 of the second retainer 94 are laterally spaced apart farther than are the rails 96, 98 of the first retainer 92. Thus, the first, second and third walls 140-144 of the second retainer 94 are laterally longer than are the corresponding walls 104, 108, 116 of the first retainer 92. Otherwise, the second retainer 94 may include the same features of the first retainer 92 and may be similarly shaped, and the further description of the first retainer 92 is incorporated here for the second retainer 94.

FIGS. 1-3 show the bracket 30 fully assembled, with the first and second retainers 92, 94 overlapped with each other and with the receiver 50 and mount body 48, to hold the receiver 50 in position on the mount body. The bracket assembly process will now be described. Prior to placing the receiver 50 in the pocket 60 of the mount body 48, a first leg 52 of the mount body 48 is received through the opening 112 of the first retainer 92, with the first wall 104 and third wall 116 received adjacent to the inner surface 57 of the mount body 48 and the second wall 108 received adjacent to the outer surface 59 of the mount body. The first retainer 92 is slid along the mount body 48 until the third wall 116 is arranged on the opposite side of the pocket 60 as the first and second walls 104, 108. That is, the first retainer 92 spans from one side of the pocket 60 to the other. The other leg 52 of the mount body 48 is received through the opening 154 of the second retainer 94, with the first wall 140 and third wall 144 of the second retainer 94 received adjacent to the inner surface 57 of the mount body 48 and the second wall 142 received adjacent to the outer surface 59 of the mount body 48. The second retainer 94 is slid along the mount body 48 until the third wall 144 is arranged on the opposite side of the pocket 60 as the first and second walls 140, 142. That is, the second retainer 94 spans from one side of the pocket 60 to the other.

To arrange the retainers 92, 94 in their final position, the first retainer 92 must be elastically and resiliently flexed to allow the third wall 116 of the first retainer 92 to pass over the first wall 140 of the second retainer 94. Similarly, the second retainer 94 must be elastically and resiliently flexed to allow the third wall 144 of the second retainer 94 to pass over the first wall 104 of the first retainer 92. Upon being released, the resilient nature of the material of the retainers 92, 94 causes them to return to or toward their unflexed states with the third walls 116, 144 vertically overlapping the first walls 104, 140 of the other retainer, and with the first walls 104, 140 being between the pocket 60 and the third walls 116, 144.

The rails 96, 98 of the first retainer 92 are received between: 1) axially opposed sides 164, 166 (FIG. 5) of the mount body 48 and axially opposed sides 168, 170 (FIG. 4) of the receiver 50; and 2) the rails 136, 138 of the second retainer 94. Along at least a majority of the longitudinal length of the pocket 60, the rails 96, 98, 136, 138 may be arranged at the same vertical height, and lateral shifting of the second retainer 94 relative to the first retainer 92 may be limited by engagement of one rail of the second retainer 94 with an adjacent rail of the first retainer 92. Lateral shifting of the first retainer 92 may be limited by engagement of the rails 96, 98 with the mount body 48 (or receiver 50) or by engagement of one rail of the first retainer 92 with a rail of the second retainer 94.

With the retainers 92, 94 positioned as described, the receiver 50 can be inserted into the pocket 60 to connect the receiver 50 to the mount body 48. To do this, the first tab 68 is aligned with and slid into the opening 112 in the first retainer 92, and the second tab 70 is aligned with and slid into the opening 154 in the second retainer 94. The retainers 92, 94 may be slid longitudinally relative to the mount body 48 as needed to permit the tabs 68, 70 to be received in the respective openings 112, 154 arranged on opposite sides of the pocket 60. That is, the distance between the third and fourth bends 160, 162 of the cage 146 of the second retainer 94 provide a space in which the first retainer 92 can slidably move relative to the second retainer 94, and vice versa. In one direction, the limit to longitudinal movement of one retainer is defined by the third stop surface of the other retainer, and in the other direction the limit to longitudinal movement of one retainer is the outer surface 64 of the receiver 50. To inhibit movement of the retainers 92, 94 from their fully assembled position, the openings 112, 154 may be sized to closely receive a respective tab 68, 70 and portion of the mount body 48. That is, a tight, friction fit of the tabs 68, 70 and mount body 48 may be provided in the openings 112, 154 upon insertion of the tabs therein. Additionally or instead, a friction increasing material, such as a compressible polymer may be provided on one or more of the first stop surfaces 100, 148, second stop surfaces 102, 150, the tabs 68, 70 and the portions of the mount body 48 engaged by the second walls of the retainers 92, 94 (e.g. part of the outer surface 59). Additionally or instead, a clip, other fastener or a bond including an adhesive, weld or the like, may be provided to limit or prevent sliding movement of the retainers 92, 94 after assembly of the receiver to the mount body. The third wall of either retainer may overlap the adjacent tab in at least some implementations although this is not required.

Further, as noted above, the mount body 48 of the bracket 30 can be installed to the propshaft assembly 10 after the propshaft assembly 10 is assembled and other actions, like painting have occurred. The retainer assembly 46 enables the receiver 50 to be coupled to the mount body 48 without requiring the receiver to be welded or otherwise permanently fixed to the mount body. Further, the retainers 92, 94 may be designed such that the installation can be completed manually by an installer with only their hands or with hand tools, and without the need for power tools. In this way, the relatively large mount body 48 need not be installed onto the propshaft until the propshaft is ready for installation on a vehicle. This enables the propshaft assembly 10 to be worked on and shipped without large brackets attached thereto, and can save space in shipping containers and in processing stations, like paint booths or the like. Accordingly, the bracket 30 provides significant practical advantages. Further, as noted, in addition to these advantages, in at least some implementations, the bracket 30 may be formed from stamped metal materials and may be lighter weight and less expensive than larger cast metal brackets that have been used.

The forms of the invention herein disclosed constitute presently preferred embodiments and many other forms and embodiments are possible. It is not intended herein to mention all the possible equivalent forms or ramifications of the invention. It is understood that the terms used herein are merely descriptive, rather than limiting, and that various changes may be made without departing from the spirit or scope of the invention.

All terms used in the claims are intended to be given their broadest reasonable construction and their ordinary meanings as understood by those skilled in the art unless an explicit indication to the contrary is made herein. When a surface is described as facing a certain direction, the direction referred to is the direction of an arrow that has its base on the noted surface and that extends perpendicularly away from the surface. In particular, use of the singular articles such as "a," "the," "said," etc. should be read to recite one or more of the indicated elements unless a claim recites an explicit limitation to the contrary.

The invention claimed is:

1. A bracket for a rotating shaft, comprising:
a base having a mount body and a receiver, the receiver having a circumferentially extending inner surface and an outer surface, a first tab extending from the outer surface to a first free end spaced from the outer surface, and a second tab extending from the outer surface to a second free end spaced from the outer surface, wherein the first tab and second tab overlap spaced apart portions of the mount body; and
a retainer assembly having a first retainer and a second retainer, the first retainer having a first end including a first end with a first opening through which the first tab and part of the mount body is received, the second retainer having a first end with a second opening through which the second tab and part of the mount body is received, the first retainer having a second end opposite to the first end of the first retainer and overlapping the first end of the second retainer with the first end of the second retainer located between the second end of the first retainer and an outer surface of the receiver, and the second retainer having a second end opposite to the first end of the second retainer and overlapping the first end of the first retainer with the first end of the first retainer located between the second end of the second retainer and an outer surface of the receiver.

2. The bracket of claim 1 wherein, adjacent to the second end of the first retainer, the first retainer includes a cage that extends over the first end of the second retainer.

3. The bracket of claim 1 wherein, adjacent to the second end of the second retainer, the second retainer includes a cage that extends over the first end of the first retainer.

4. The bracket of claim 1 wherein the first retainer includes a first stop surface engaged with the first tab and a second stop surface engaged with a surface of the mount body on an opposite side of the mount body from a side of the mount body that is contacted by the first tab, and wherein the first opening extends between the first stop surface and the second stop surface.

5. The bracket of claim 1 wherein the second retainer includes a first stop surface engaged with the second tab and a second stop surface engaged with a surface of the mount body on an opposite side of the mount body from a side of the mount body that is overlapped by the second tab, and wherein the second opening extends between the first stop surface and the second stop surface.

6. The bracket of claim 1 wherein the mount body has an inner surface, and the mount body has a pocket that with reference to the inner surface is concave, and wherein part of the receiver is located in the pocket with at least part of the outer surface of the receiver against a surface of the mount body in the pocket, and wherein the portions of the mount body that are overlapped by the first tab and the second tab are on opposite sides of the pocket.

7. The bracket of claim 6 wherein the inner surface of the receiver has a central axis, the receiver has a width in the axial direction, the mount body has a width in the axial direction and the first retainer includes two rails that extend between the first end of the first retainer and the second end of the first retainer, and wherein the two rails are spaced apart by a distance greater than the width of at least the part of the receiver located in the pocket and the width of the mount body at the pocket, and a portion of the receiver and mount body is located between the two rails.

8. The bracket of claim 7 wherein the second retainer includes two rails that extend between the first end of the second retainer and the second end of the second retainer, and wherein part of the receiver located in the pocket and a portion of the mount body are located between the two rails of the second retainer.

9. The bracket of claim 4 wherein the first stop surface and second stop surface are spaced apart a distance so that the first tab and adjacent portion of the mount body are closely received between the first stop surface and the second stop surface to trap the first tab against mount body.

10. The bracket of claim 1 wherein the mount body is a separate component from the receiver and the receiver is held against the mount body by the first retainer and the second retainer.

11. A shaft assembly, comprising:
a shaft arranged for rotation about an axis;
a bearing coupled to the shaft;
an isolator coupled to the bearing; and
a bracket coupled to the isolator, the bracket including:
- a base having a mount body and a receiver, the receiver having a circumferentially extending inner surface and an outer surface, a first tab extending from the outer surface to a first free end spaced from the outer surface, and a second tab extending from the outer surface to a second free end spaced from the outer surface, wherein the first tab and second tab overlap spaced apart portions of the mount body; and
- a retainer assembly having a first retainer and a second retainer, the first retainer having a first end including a first end with a first opening through which the first tab and part of the mount body is received, the second retainer having a first end with a second opening through which the second tab and part of the mount body is received, the first retainer having a second end opposite to the first end of the first retainer and overlapping the first end of the second retainer, and the second retainer having a second end opposite to the first end of the second retainer and overlapping the first end of the first retainer.

12. The shaft assembly of claim 11 wherein the first retainer includes a first stop surface engaged with the first tab and a second stop surface engaged with a surface of the mount body on an opposite side of the mount body from a side of the mount body that is contacted by the first tab, and wherein the first opening extends between the first stop surface and the second stop surface.

13. The shaft assembly of claim 12 wherein the second retainer includes a first stop surface engaged with the second tab and a second stop surface engaged with a surface of the mount body on an opposite side of the mount body from a side of the mount body that is overlapped by the second tab, and wherein the second opening extends between the first stop surface and the second stop surface.

14. The shaft assembly of claim 11 wherein the mount body has an inner surface, and the mount body has a pocket that with reference to the inner surface is concave, and wherein part of the receiver is located in the pocket with at least part of the outer surface of the receiver against a surface of the mount body in the pocket, and wherein the portions of the mount body that are overlapped by the first tab and the second tab are on opposite sides of the pocket.

15. The shaft assembly of claim 14 wherein the inner surface of the receiver has a central axis, the receiver has a width in the axial direction, the mount body has a width in the axial direction and the first retainer includes two rails that extend between the first end of the first retainer and the second end of the first retainer, and wherein the two rails are spaced apart by a distance greater than the width of at least the part of the receiver located in the pocket and the width of the mount body at the pocket, and a portion of the receiver and mount body is located between the two rails.

16. The shaft assembly of claim 15 wherein the second retainer includes two rails that extend between the first end of the second retainer and the second end of the second retainer, and wherein part of the receiver located in the pocket and a portion of the mount body are located between the two rails of the second retainer.

17. The shaft assembly of claim 11 wherein the mount body is a separate component from the receiver and the receiver is held against the mount body by the first retainer and the second retainer.

\* \* \* \* \*